United States Patent [19]
Evequoz

[11] 3,730,546
[45] May 1, 1973

[54] BOBSKI

[76] Inventor: Jean-Yves Evequoz, Route de la Dixence 17, Sion, Switzerland

[22] Filed: Nov. 2, 1970

[21] Appl. No.: 85,972

[30] Foreign Application Priority Data

Nov. 1, 1969 Switzerland..................16307/69
June 15, 1970 Switzerland..................16307/69

[52] U.S. Cl. ...................................................280/16
[51] Int. Cl. ...............................................B62b 13/04
[58] Field of Search....................280/16, 21, 25, 20

[56] References Cited

UNITED STATES PATENTS

| | | | |
|---|---|---|---|
| 3,438,643 | 4/1969 | Spiehs | 280/20 X |
| 3,178,196 | 4/1965 | Colace | 280/16 |
| 3,525,411 | 8/1970 | Hagen | 280/25 |
| 1,499,299 | 6/1924 | Hatosy et al. | 280/25 X |
| 712,580 | 11/1902 | Norgate | 280/16 X |
| 2,615,724 | 10/1952 | Lee | 280/20 |
| 3,588,138 | 6/1971 | Cerny | 280/16 |
| 3,561,783 | 2/1971 | Ellett | 280/16 |
| 3,450,413 | 6/1969 | Brenter | 280/16 |
| 3,425,707 | 2/1969 | Horiuchi et al. | 280/25 X |
| 3,361,436 | 1/1968 | Williams | 280/16 |
| 3,482,848 | 12/1969 | Hellstern | 280/16 |

Primary Examiner—Benjamin Hersh
Assistant Examiner—Robert R. Song
Attorney—Raymond A. Robic

[57] ABSTRACT

A bobski comprising at least a front ski, a rear ski, a steering column, a handle bar connected to the said steering column, a frame for connecting the steering column to the rear ski, and a resilient suspension device for connecting the frame to the rear ski.

1 Claim, 2 Drawing Figures

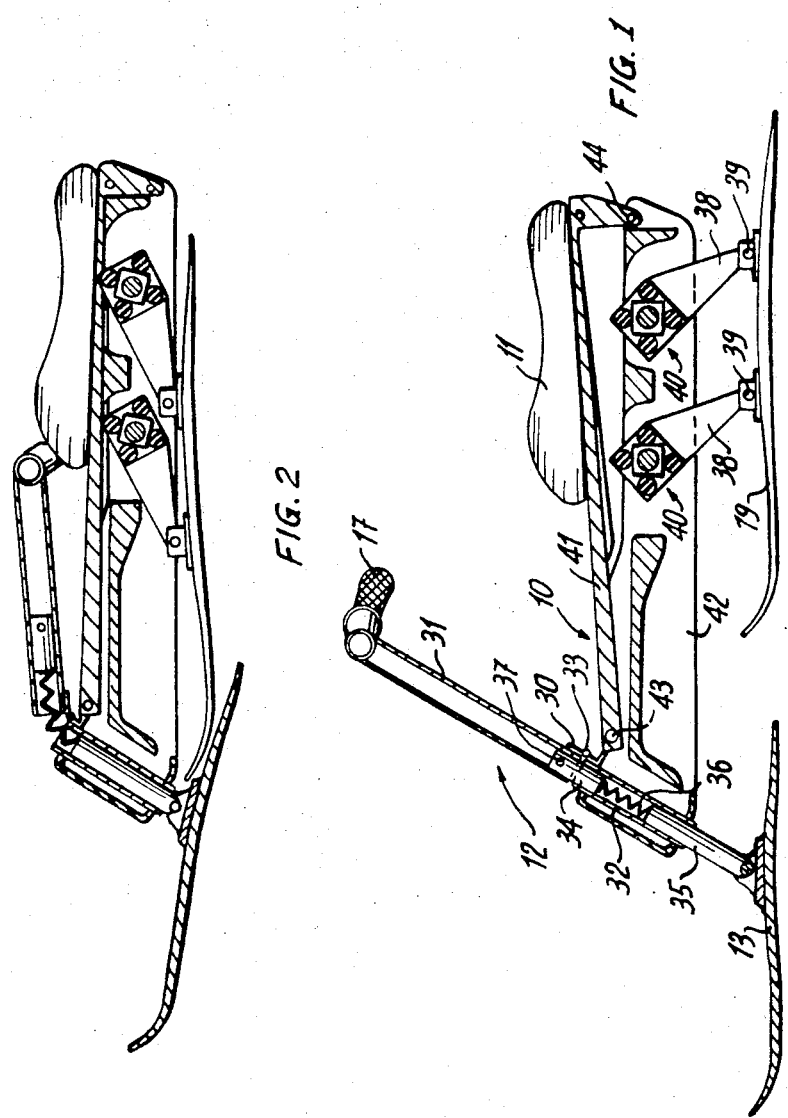

BOBSKI

The present invention relates to a bobski and in particular to a new suspension for a bobski so as to improve its riding stability.

The known bobskis comprise a frame, a seat, a front ski which may be oriented by means of a handle bar and at least one rear ski rigidly secured to the frame, the combination of all the parts resembling a bicycle having skis instead of wheels. The people using these bobskis generally wear small skates on their feet so as to maintain their balance. This type of bobski is uncomfortable and unstable.

The bobski according to the present invention enables to improve the performance of these devices by improving their stability, their comfort and their balance.

More specifically, a bobski made according to the present invention comprises a generally horizontal passenger-carrying frame having a steering column secured to its front end and including a handle bar, a front ski resiliently connected to the forward part of the frame and a pair of parallel rear skis at the rear end of the frame. These skis are connected to the frame by two pairs of arms, each pair joining one of the skis to the frame with the arms of a pair disposed to form, with the frame and with the ski to which they are joined, a parallelogram extending longitudinally of the frame. One end of each arm is connected to the ski for pivotal movement about an axis transverse to the ski. Means pivotally connect the other end of the arms to the frame for pivotal movement thereof about axes transverse to the frame, and including resilient means urging the arms in one of two predetermined positions: one wherein the frame stands away from the skis and one wherein it is collapsed over the skis.

Further objects and other advantages of the invention will be afforded by the following description thereof of a preferred embodiment having reference to the appended drawings wherein:

FIG. 1 is a vertical cross-sectional view of the embodiment according to the invention, the bobski being in erected position, and FIG. 2 is a view similar to that of FIG. 1 showing the bobski in collapsed position for transportation.

The embodiment shown in FIGS. 1 and 2 comprises a stream-lined frame 10 provided with a seat 11, a steering column 12 pivoted in a bearing 30 of the frame, a front ski 13, a handle bar 17 and two rear skis 19.

The steering column 12 is made of two tubes 31 and 32 connected together by an articulated member 33 and two cylindrical elements 34 and 35. The element 35 may slide in the tube 32 against the bias of a spring 36. The element 34 is mounted between the tubes 31 and 32 by a pin 37 so as to lock them in a coaxial arrangement. When element 34 is fixed to the tube 31 by the pin 37, steering may be obtained by rotation of the handle 17, causing rotation of the element 35 through the spring 36 and hence rotation of the ski 13.

If the lock pin 37 is removed, the element 34 is released and by pressing down on the frame 10, the tube 32 moves over the element 35 while the tube 31 receives and completely house the element 34. In this manner, the steering column 12 may be collapsed, through the articulation 33, as shown in FIG. 2.

The two rear skis 19 are mounted on the frame of means of resilient suspensions formed of four arms 38, the axles 39 pivotally connecting one end of the arms 38 to the skis 19 and the shock absorbers 40 connecting the other ends of the arms 38 to the frame 10. The arms 38 by virtue of the illustrated shock absorbers 40, may take on two different positions such as illustrated respectively in FIGS. 1 and 2, the first corresponding to the operating position of the bobski while the second is contemplated for reducing the volume of the bobski so as to facilitate its transportation.

Thus, the four arms 38, the two skis 19 and the part 42 of the body define two independent resilient deformable parallelograms movable between two positions: the erected position of FIG. 1 wherein the frame 10 stands away from the skis 19 and the collapsed position wherein the same frame 10 lies over the rear skis 19 in collapsed position.

The frame 10 is made up of two parts 41 and 42 pivoted about an axle 43. The parts 41 and 42 may be spread apart (FIG. 1) and held in that position by a pin 44 or pushed one against the other (FIG. 2).

I claim:

1. A bobski comprising a frame, a steering column and a handle bar secured to the front part of said frame, a front ski resiliently connected to the forward part of said frame, a pair of parallel rear skis resiliently connected to the rear part of said frame, two resilient distinct suspension devices, each rear ski being independently connected to the frame by one of said suspension device, wherein each suspension device comprises two parallel arms pivotally connected at each end to the frame and the rear ski, a shock absorbing means for urging the said arms in a predetermined angular position relative to the frame, and wherein the shock absorbing means is disposed about an axle at the intersection of each arm and the frame.

* * * * *